Sept. 18, 1956　　　T. O. SUMMERS, JR　　2,763,157
AUTOMATIC MECHANISM FOR CONTROLLING
ERECTION OF A GYROVERTICAL Filed May 29, 1953　　　　　　　　　　　3 Sheets-Sheet 1

THOMAS O. SUMMERS, JR.
INVENTOR.

BY R. E. Geangue

ATTORNEY

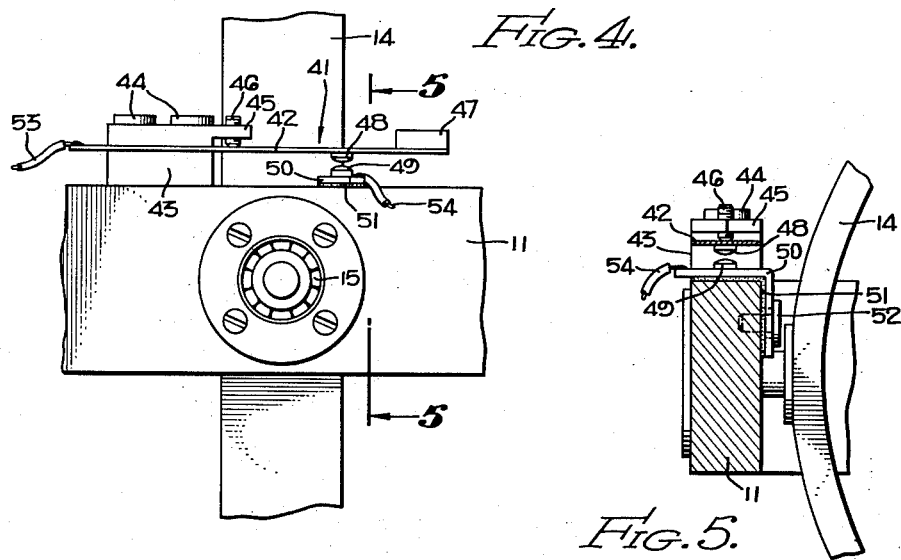
FIG. 4.
FIG. 5.
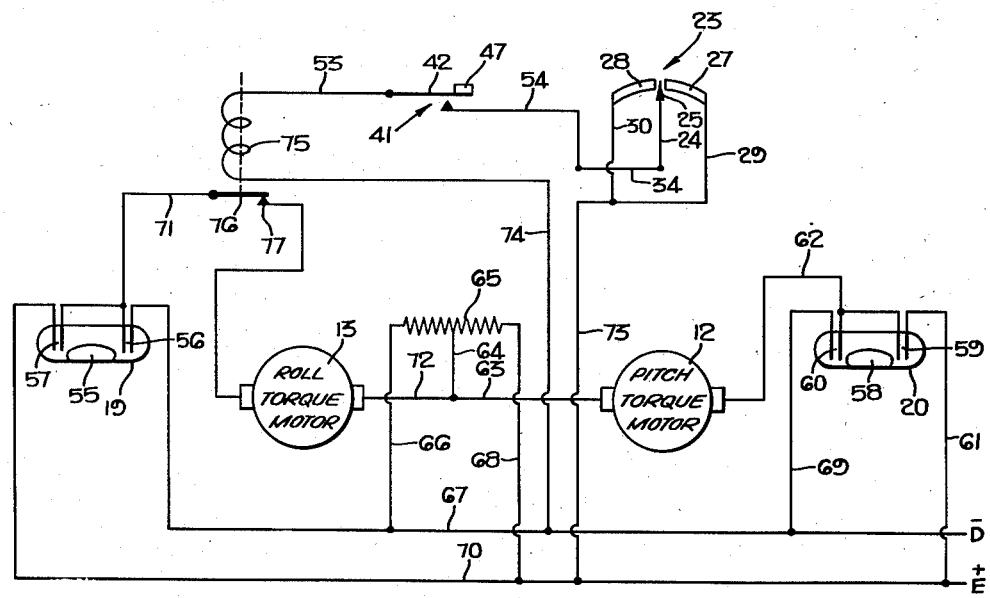
FIG. 6.
THOMAS O. SUMMERS, JR.
INVENTOR.
BY R. E. Geangue
ATTORNEY

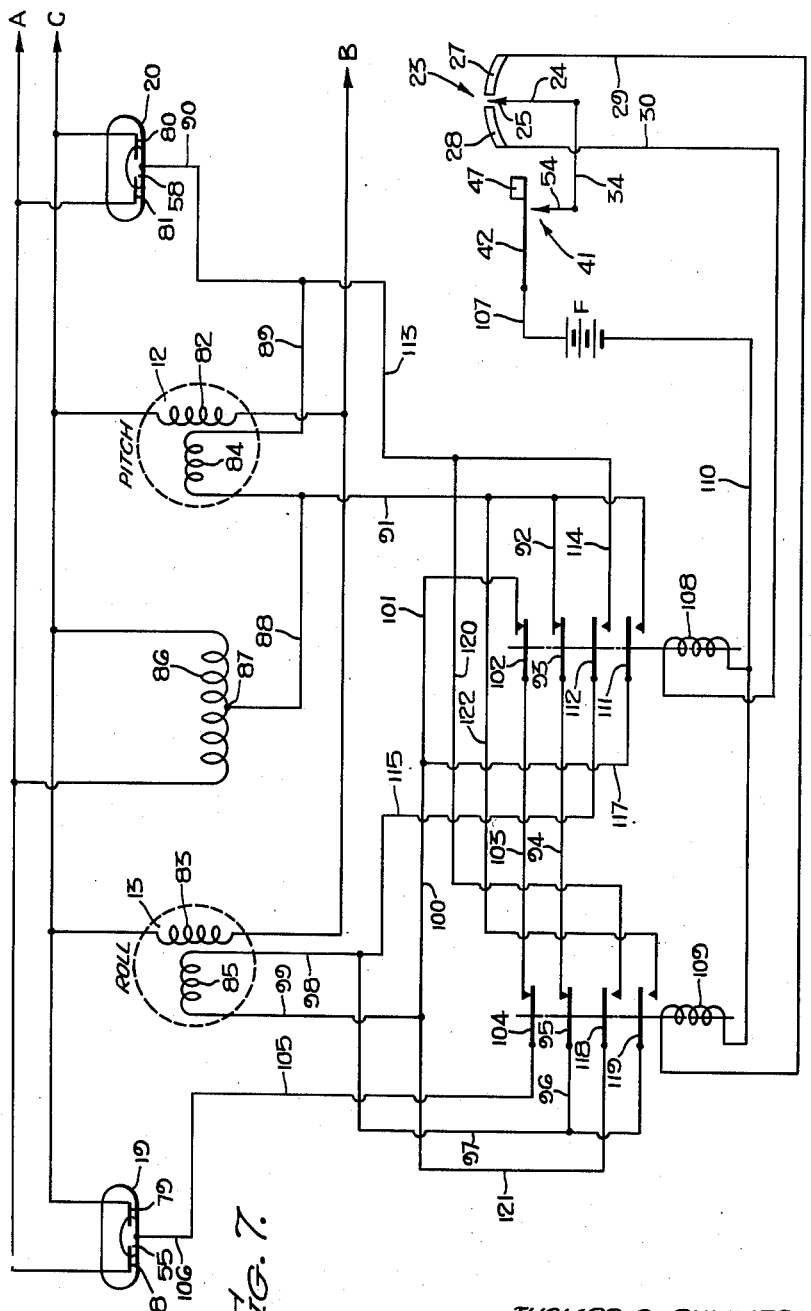

United States Patent Office 2,763,157
Patented Sept. 18, 1956

2,763,157

AUTOMATIC MECHANISM FOR CONTROLLING ERECTION OF A GYROVERTICAL

Thomas O. Summers, Jr., Sherman Oaks, Calif.

Application May 29, 1953, Serial No. 358,265

14 Claims. (Cl. 74—5.47)

This invention relates to an automatic mechanism for erecting a gyrovertical during turns, and, more particularly, to an automatic mechanism for utilizing the pitch erection of the gyrovertical to control the roll erection during turns, to thereby reduce the pitch error.

As has been previously disclosed in U. S. Patent No. 2,542,975 to John S. Adkins, dated February 27, 1951, the bank error in a gyroscope developed during a turn is ordinarily converted into an indicated pitch error at the termination of the turn, and by placing the roll-erecting mechanism under the control of the pitch gravity sensitive means during the turn, these turn errors are greatly reduced. The means for placing the roll-erecting mechanism under the control of the pitch gravity sensitive means are described in the above-mentioned patent as being either manual switches or switches connected to the steering mechanism or switches controlled by a rate-of-turn gyroscope.

In the present invention, it is proposed to accomplish this change in control of the roll-erecting mechanism without the necessity of employing rate gyro or manually operated switches. This is made possible by mounting a switch about the roll axis of a gyroscope to detect bank angle, and inasmuch as an airplane turns when it is banked, such a switch will detect both turn and direction of turn when the gyrovertical is mounted in the usual manner in an airborne craft. In order that the device of the present invention can direct the craft under all conditions, such as when the aircraft is on the ground prior to take-off as well as when it is airborne, it is important to provide that the switch about the roll axis will not cut out the roll-erection controller when the aircraft is not airborne. In order to preclude such an undesirable result, a gravity switch is mounted within the casing of the instrument in series with the roll-detector switch mounted about the roll gimbal axis. When the craft is airborne, the gravity switch will remain open and prevent the roll-detector switch from interfering with the normal erection of the gyroscope, and in the event that the aircraft moves into a turn, the gravity switch will close so that the roll-detector switch will become effective to place the roll-erection means under the control of the pitch gravity-sensitive means. However, when the aircraft is on the ground, the gravity switch will not experience the acceleration forces resulting from a turn, and thus, the roll-detector switch will be bypassed so that the erecting mechanism will function normally to erect the gyroscope to vertical during the time the craft is on the ground. It will be apparent that the present invention eliminates the necessity of manually-operated-switch means and the necessity of turn-sensitive means to control the switch means, since the invention employs a single roll-detector switch about the roll axis in combination with a gravity-sensitive switch.

It is, therefore, an object of the present invention to provide an automatic mechanism for placing the roll-erecting mechanism of a gyroscope under the control of the pitch gravity-sensitive means during a turn without the necessity of utilizing manual switches or other complicated devices sensitive to the turn of the aircraft.

Another object of the invention is to provide an automatic-switch means which includes a roll-detector switch about the roll axis of the gyroscope, and a gravity-sensitive switch responsive to the turning of the aircraft.

A further object of the invention is to provide an automatic-switching means for controlling the roll-erection device by the pitch gravity-sensitive means during turning of the aircraft, which switching means requires no additional turn-sensitive devices nor does it require manual operation.

A still further object of the invention is to provide an automatic switching means for placing the roll-erecting mechanism under control of the pitch gravity-sensitive means during turns and which is ineffective to cause such switching when the aircraft is on the ground and it is desired to erect the gyroscope to true vertical.

These, and other objects of the invention not specifically enumerated above, will become readily apparent from the following specification and drawings, in which:

Fig. 4 is an elevational view of the gravity-sensitive switch along line 4—4 of Fig. 1, showing the manner in which the gravity-switch is secured to the frame of the gyroscope in order to be sensitive to turning of the aircraft.

Fig. 5 is a vertical sectional view along line 5—5 of Fig. 4, illustrating the gravity-sensitive switch.

Fig. 6 is one form of a schematic wiring diagram for the present invention, in which the roll-erection is completely eliminated during a turn.

Fig. 7 is a schematic wiring diagram of another form of control which can be used in connection with the present invention to provide that the roll-erection mechanism is under the control of the pitch gravity-sensitive means.

Figure 1:
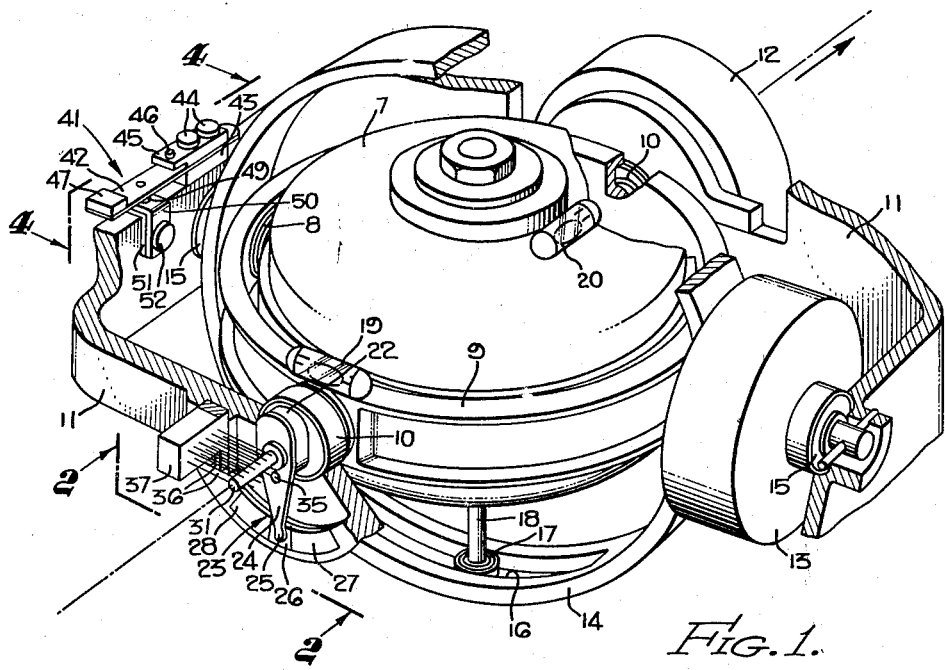
Fig. 1 is a perspective view of the vertical gyroscope utilized in connection with the present invention illustrating the erecting motors and also the roll-detector switch and the gravity-sensitive switch.
Figures 2, 3:
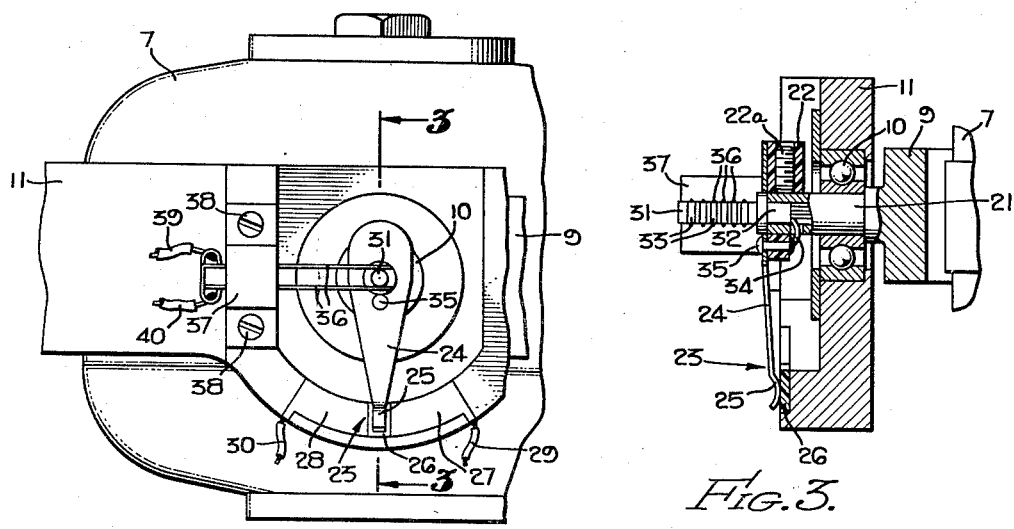
Fig. 2 is an elevational view along line 2—2 of Fig. 1, illustrating the electrical connections for the roll-detecting switch placed about the roll axis of the gyroscope.
Fig. 3 is a vertical sectional view along line 3—3 of Fig. 2, showing the manner in which the roll-detector switch is connected to the roll gimbal of the gyroscope.

The embodiment of the present invention chosen for illustration includes a vertical gyroscope having an inner gimbal 7 which contains the motor and rotor for the gyroscope. This inner gimbal 7 is pivotally mounted on bearings 8 (only one of which is shown) retained in outer gimbal 9. This outer gimbal is rotatably mounted by bearings 10 contained in the gyroscope frame 11. A first erecting motor 12 is mounted on frame 11 and is connected to the outer gimbal 9 in order to place an erecting torque thereupon to erect the gyroscope about the inner gimbal axis. The erecting motor 13 is likewise mounted by frame 11 and is connected to a neutrally balanced bail 14 which is pivotally mounted by bearings 15 retained in frame 11 so that the bail can move about the pitch axis of the gyroscope. The bail 14 has a groove 16 which receives a roller 17 carried by a shaft 18 connected to the inner gimbal 7. It is, therefore, apparent that a torque exerted by motor 13 upon bail 14 will be transmitted to the inner gimbal 7 and will cause precession of the gyroscope about the outer gimbal axis, and the gyro is free to move about the outer gimbal axis because of slot 16. Since bail 14 is neutrally balanced, it will not place unwanted erection torques upon the gyroscope in the absence of an erecting force from motor 13. The direction of movement of the aircraft is indicated by the arrow in Fig. 1.

In order to gravity-erect the gyroscope about the roll axis, a first electrolytic gravity-sensitive switch 19 is placed on the outer gimbal at the roll axis. This switch energizes the erection motor 13 when the spin axis of the gyroscope becomes displaced from true vertical about the roll axis, and, of course, the torque placed on the inner gimbal by motor 13 will move the outer gimbal and correct any such displacement. A second electrolytic gravity-switch 20 is mounted on the inner gimbal axis in position to be sensitive to movement of the spin axis of the gyroscope away from vertical about the pitch axis, and this switch 20 energizes erecting motor 12 to place a torque on the outer gimbal to precess the gyroscope about the inner gimbal to true gravity-vertical position about the pitch axis. The construction so far described represents the usual manner in which erection motors are utilized to torque the gyrovertical to its gravity-vertical position.

A construction will now be described which provides for the automatic switching of the control for erecting motor 13 in the event of turning of the aircraft, which provides for eliminating the control of switch 19 over motor 13. The shaft 21 for outer (roll) gimbal 9 extends through frame 11 and carries at its outer end an insulated support member 22 which is secured to the end of the shaft by set screw 22a. The roll-detector switch 23 has a switch arm 24 secured to the face of the member 22 so that it will be positioned by the outer gimbal, and the wiper 25 at the end of the switch arm is normally in contact with an insulated section 26 carried by frame 11 when the aircraft is in straight flight. A pair of contact plates 27 and 28 are likewise carried by frame 11 on opposite sides of insulated member 26 and are so positioned that wiper 25 moves into contact with plate 27 when the aircraft rolls to the right and moves into contact with plate 28 when the aircraft rolls to the left. The contact plates 27 and 28 are circular in form so that they may make contact with wiper 25 during a considerable angle of bank, and leads 29 and 30, respectively, are connected to these plates as part of the circuit of the roll-detector switch.

A pin 31 has a projection 32 received by the opening in shaft 21, and a number of slip rings 33 are carried by the pin in order to conduct electrical energy through the pin 31 and shaft 21 to the outer gimbal 9 by means of the required number of leads. One such lead 34 connects with conducting rivet 35, which is in contact with switch arm 24 in order to supply electrical energy to wiper 25. A double wire brush 36 is provided for each of the slip rings 33 and these wipers are supported by an insulated member 37 which is secured to frame 11 by means of screws 38. Leads 39 and 40 are the supply and return leads for the double wire brushes and supply electrical energy to the various circuits of the gyroscope. It will be apparent that leads 30 and 34 comprise the circuit for the roll-detector switch when the aircraft rolls to the left, and that leads 29 and 34 comprise the circuit through the switch when the aircraft rolls to the right. Therefore, the roll-detector switch serves as a means for determining in which direction the aircraft is turning while in flight.

In order to prevent the roll-detector switch from being effective at any time other than when the aircraft is in flight, an acceleration-sensitive switch 41 is placed in series with the roll-detector switch 23 so that this last-mentioned switch can only be effective when acceleration-sensitive switch 41 is closed. The acceleration switch has an arm 42 which is carried by an insulated bracket member 43 secured to frame 11 by screws 44. The bracket 43 has an extension 45 which contains a screw 46 which bears against the arm 42. The end of the arm carries a weight 47 which serves to move the switch arm toward the frame 11 under the influence of the acceleration force developed when the aircraft is placed in a turn in either direction. A contact 48 is carried by the arm 42 in position to move into engagement with contact 49 which is secured to a conducting member 50. The member 50 is insulated from the frame 11 by insulation 51 and is secured to frame 11 by screw 52. The leads 53 and 54 connect with switch arm 42 and plate 50, respectively, in order to provide a circuit when contacts 48 and 49 are together. The switch arm 42 is so positioned on the frame 11 that it is directly over the pitch axis of the gyroscope, and therefore, the influence of the acceleration forces developed on weight 47 during turning of the aircraft in either direction will cause the arm 42 to move toward frame 11 and close the contacts 48 and 49. It will be apparent that the acceleration force required to close the contacts can be adjusted by screw 46 and that no force will be developed on weight 47 while the aircraft is resting on the ground.

The mechanism of the present invention can be utilized in one manner to completely disengage the roll-erecting mechanism when the aircraft is placed in a turn so that the acceleration forces experienced during the turn, which would normally cause erection away from true gravity vertical, cannot accomplish this result. The wiring diagram shown in Fig. 6 can be utilized for this purpose, and the roll gravity-sensitive switch 19 is shown as composed of an electrolyte 55 and two pairs of contacts 56 and 57. The gravity-sensitive switch 20 is shown as composed of an electrolyte 58 and two pairs of contacts 59 and 60. In normal operation, when the aircraft is on the ground or when it is in straight flight, any deviations of the spin axis away from true vertical about the pitch axis will cause the electrolyte 58 to close the contacts 59 if the deviation is in one direction, and close the contacts 60 if the deviation is in the other direction. If contacts 59 are closed, current will flow through line 61 from supply "E" and energize the motor 12 through line 62 in order to torque the gyroscope in a direction to return the spin axis to true vertical. The return line 63 for the motor 12 connects with a lead 64 connecting with the center of a current-divider 65. The return current will pass through the left side of divider 65 and return through lines 66 and 67 to terminal D in order to complete the circuit for the motor. In the event that the electrolyte 58 closes the contacts 60, current will flow in the opposite direction through motor 12 and cause it to exert a torque in the opposite direction. The current will flow from source "E" through line 68 and the right side of current-divider 65 to lines 64 and 63, and will return from the motor through line 62 and line 69 to terminal D. Thus, depending upon which direction the inner gimbal is tipped away from true vertical about the pitch axis, the proper correction will be made by torquing motor 12 to bring the spin axis back to true vertical.

In the same manner, if the electrolyte 55 moves into position to close the contacts 57, current will flow through line 70 and through contacts 57 and line 71 to the roll-erecting motor 13. The return lead 72 for motor 13 connects with lead 64 and current will flow through the left half of divider 65 and through leads 66 and 67 back to terminal D. If the electrolyte 55 moves in a direction to close contacts 56, the motor 13 will be energized in the reverse direction and current will flow through line 70 from source E and then to line 68 and through the right half of divider 65 and will connect with the roll-erecting motor 13 through leads 64 and 72. The return for the motor will be through line 71, contacts 56 and line 67. Thus, it is apparent that if the spin axis of the gyroscope moves away from true vertical about the roll axis, causing the electrolyte 55 to move in one direction or the other, the motor 13 will be so energized as to precess the spin axis back to vertical in the same manner that motor 12 precesses the spin axis to true vertical about the pitch axis.

In addition to the usual erecting mechanism which has been just described, the present invention provides for removing the roll-erection from the gyroscope when the aircraft is placed in a turn. The leads 29 and 30 for contact plates 27 and 28, respectively, are connected with source E by lead 73, and the contact arm 24 of roll-detector switch 23 is placed in series with gravity-sensitive switch 41 by connecting leads 34 and 54. The arm 42 of switch 41 is connected to terminal D through a lead 74 in which is placed a solenoid 75. The armature for solenoid 75 acts on switch 76 which is positioned in line 71 and co-acts with contact point 77, and it is apparent that when switch arm 76 is opened by the energization of solenoid 75, the roll-erecting motor 13 cannot be energized in order to erect the gyroscope about the roll axis. Therefore, when the mounting aircraft is in flight and goes into a turn, either contact 27 or 28 will move under wiper 25 and at the same time, the acceleration forces experienced by weight 47 will close switch 41, so that the solenoid 75 will be energized to remove the effect of the roll-erection system. Thus, if the spin axis is in true vertical position before the aircraft enters the turn, it will remain in such condition since there will be no erection control over the position about the roll axis during the turn, and this will prevent the spin axis from being falsely erected about the roll axis in such a manner that this false erection will show up as a pitch error after the turn is completed. It is pointed out, however, that if the aircraft is on the ground, the mere fact that the contact plate 27 or 28 moves under wiper 25 will not remove the roll-erection system, since there will be no acceleration forces on weight 47 to closed switch 41, and unless both switches 23 and 41 are closed, there can be no energization of solenoid 75. Therefore, the present invention will not interfere with the normal erection while the aircraft is on the ground in any position or while the aircraft is in straight flight in the air.

Another manner in which the present invention can be utilized to alleviate the roll-erection during the turn, which causes a pitch error, is shown in Fig. 7, wherein like reference numerals represent like parts. The electrolytic gravity switch 19 contains a pair of rods 78 and 79 while the electrolytic gravity switch 20 contains a pair of rods 80 and 81. These rods project into the electrolytes 55 and 58, respectively, an equal amount during straight flight. However, when the electrolytes move away from centered position because of a movement of the spin axis away from true vertical about the pitch or the roll axis, more current will flow in one rod than the other of each gravity-sensitive switch, thus controlling the degree and direction of the application of the torque to the corresponding erection motors. The diagram of Fig. 7 will first be explained in connection with normal operation, during which time the switches in wiring diagram are in the centered position as shown. Current is introduced at terminals A, B, and C from any suitable source, the terminals B and C being connected to the stator coils 82 and 83, respectively, of the pitch and roll-erecting motors, so as to provide a fixed or constant potential through the stator coils. Controlling field coils 84 and 85, respectively, of the pitch and roll-erecting motors are supplied with electrical energy in a relatively 90° out-of-phase relation.

The terminals A and C are bridged by a center-tap coil 86, with the center-tap 87 connected to a conductor 88, which leads to one end of the field coil 84 of the pitch-erecting motor 12. The other end of the field coil 84 is connected by a conductor 89 to the lead 90 from the center terminal of the switch 20. Current from the terminals A and C is thus normally balanced by the resistance of the electrolyte of the switch 20 when the inner gimbal is level with the electrolyte at the center. If the electrolyte 58 moves to cover rod 81, then the current flowing to coil 84 will be predominantly from source A, and if the bubble moves to cover rod 80, then the current in coil 84 will be predominantly from source C, and it is apparent that the amount and direction of torque developed by motor 12 will depend upon the amount and direction of movement of electrolyte 58.

In a like manner, the center-tap 87 is also connected to one side of coil 85 of motor 13 through leads 91, 92, 94, 96, 97 and 98 and through switches 93 and 95. The other side of coil 85 is connected to the center terminal 106 of gravity switch 19 through leads 99, 100, 101, 103, 105 and through switches 102 and 104. Therefore, the current supply to field coil 85 of roll-erecting motor 13 is determined by the movement of electrolyte 55 over rods 78 and 79 in the manner similar to that described in connection with switch 20. The amount and direction of the roll-erecting torque will depend upon the amount and direction of movement of electrolyte 55.

When the aircraft is placed into a turn, it is desirable to have the roll-erection motor 13 under control of the pitch gravity-sensitive switch 20 in the manner described in the previously mentioned patent. In order to compensate for turn error during a left turn, it is provided that the roll-erection motor will erect the top of the gyroscope to the left when the pitch-erecting motor erects the top of the gyroscope forward, and when the pitch-erecting motor erects the top of the gyroscope aft it should also cause the roll-erection motor to erect the top of the gyroscope to the right. Similarly during a right turn, when the pitch-erecting motor erects the top of the gyroscope aft, it should also cause the roll-erection motor to erect the top of the gyroscope to the left, and when the pitch-erecting motor erects the top of the gyroscope forward, it should also cause the roll-erection motor to erect the top of the gyroscope to the right. Therefore, it is necessary to provide a switching means that will connect the field coil 85 of the roll-erecting motor 13 to the pitch gravity-sensitive switch 20 in the proper manner, depending upon whether the aircraft is turning to the right or to the left.

In order to provide such a switching device, the acceleration-sensitive switch 41 and roll-detector switch 23 are again placed in series with an energy source such as a battery F. The lead 107 connects the source with switch arm 42, and leads 54 and 34 are connected together to put switches 41 and 23 in series. The lead 30 connects with a solenoid 108, while the lead 29 connects with a solenoid 109 and the solenoids have a common return lead 110 to the source F. Thus, when the aircraft rolls to the right, solenoid 109 is energized and when the aircraft rolls to the left, solenoid 108 is energized. When the solenoid 108 is energized, switches 93 and 102 will be broken and the contacts will be made for switches 111 and 112. Current will flow from the center terminal 90 through leads 113, 114, 115 and 98 and through switch 112 to one side of field coil 85. The other side of field coil 85 will be connected to center tap 87 through leads 99, 100, 117, 91 and 88, and through switch 111. It is, therefore, apparent that during a left turn when contact 28 moves under wiper 25, that the pitch gravity-sensitive switch 20 can be made to erect the top of the gyroscope to the left or right when the gyroscope is being also erected forward or aft, respectively, by the pitch-erection motor 12. However, when the aircraft goes into a right turn, the direction of erection of the gyroscope must be reversed in that when the pitch-erection motor erects the top of the gyroscope forward or aft, the roll-erection motor must erect the gyroscope to the right or left, respectively. In order to accomplish this result, when the aircraft goes into a right turn, contact 27 will move under wiper 25 and energize solenoid 109, while solenoid 108 will remain de-energized. Switches 95 and 104 will be opened, while switches 118 and 119 will be closed. In such an event, the center terminal 90 and switch 20 will be connected to one side of coil 85 of motor 13 through leads 113, 120, 121 and 99 and through switch 118. The other side of the coil 85 will be connected with center tap 87 through leads 98, 97, 122, 91 and 88 and through switch 119. It is apparent that during the time that either solenoid 108 or 109 is energized, the roll-erection motor 13 will be under the control of the pitch gravity-sensitive switch 20 and since the center terminal 90 and center tap 87 are connected to reverse sides of the field coil 85 when one or other of the solenoids 108 or 109 is energized, the required reversed erection is accomplished.

As illustrated in Fig. 7, the switches 41 and 23 provide a simple and reliable means of placing the roll-erection motor 13 under control of the pitch gravity-sensitive switch 20 during turning of the aircraft without the necessity of manual operation of switches or the use of turn-sensitive devices. Also, it is impossible for this switching arrangement to interfere with the normal erection of the gyroscope when the aircraft is on the ground, because there is no acceleration force exerted on mass 47 to complete the circuit to the solenoids. It is understood that various types of roll-detector switches, other than the one chosen for illustration, can be utilized so long as the switch indicates in which direction the aircraft is turning. Also, various types of acceleration-sensitive switches can be utilized in place of switch 41. Such acceleration switches must be so placed with respect to the direction of flight of the aircraft that they will be closed in response to acceleration forces developed during turning of the aircraft. Further, the switching arrangement of the present invention can be utilized to control any desired operation which is a function of the turning movement only of the aircraft or a function of the turning movement and direction of turn. Various other modifications are contemplated and may obviously be resorted to by those skilled in the art, without departing from the spirit and scope of the invention, as hereinafter defined by the appended claims.

What is claimed is:

1. In a gyrovertical having pitch and roll erection means responsive to gravity means positioned about the pitch and roll axes of an aircraft and having modified roll erection during a turn, a roll-detector switch positioned about the roll axis of the gyro to detect the direction of turn of the aircraft, and an on-off acceleration-sensitive switch carried in a position to be sensitive to acceleration forces developed during turning of the aircraft, said switches being in series relationship so that both switches must be closed before the roll-erection can be modified during a turn.

2. In a gyrovertical of the type having pitch and roll-erection means responsive to gravity-sensitive means about the pitch and roll axes and in which the roll erection means is placed under the control of the pitch gravity-sensitive means during a turn, a roll-detector switch positioned about the roll axis of the gyrovertical to detect both turn and direction of turn of the mounting craft, an acceleration responsive switch mounted by the gyrovertical in position to be closed in response to acceleration forces experienced during turning of the craft, said switches being placed in series so that both must be closed simultaneously to place the roll-erection means under control of the pitch gravity-sensitive means.

3. In a gyrovertical having pitch and roll erecting means and pitch and roll gravity-responsive energizing means therefor, comprising a roll-detector switch mounted about the roll axis of the gyrovertical and having a contact arm positioned by the roll gimbal and two contact plates carried by the gyro frame and separated by an insulated member, an acceleration-sensitive switch positioned on the gyrovertical so as to be closed by the acceleration forces experienced during turning of the mounting craft in either direction, said two switches being placed in series so that when said contact arm of said roll-detector switch contacts one of said plates while said acceleration-sensitive switch is closed, the control of the roll-erection means will be modified in one manner, and when said contact arm contacts the other of said contact plates and the acceleration-sensitive switch is closed, the control for the roll-erection means will be modified in another manner.

4. An automatic mechanism for modifying the control of the roll-erection means for a gyrovertical during a turn of the mounting aircraft, comprising a roll-detector switch positioned about the roll axis of the aircraft for determining in which direction the aircraft is turning and an on-off acceleration-responsive switch in series with said detector switch and closed in response to acceleration forces developed during turning of the aircraft, said switches serving as means to modify control of the roll-erection means at such time as both switches are closed and said acceleration-responsive switch being inoperative while the aircraft is on the ground to interfere with normal erection of the gyrovertical.

5. An automatic mechanism as defined in claim 4, wherein said roll-detector switch comprises a wiper arm positioned by the roll gimbal and a pair of contact plates carried by the gyroscope frame and separated by an insulated portion, one or the other of said contact plates moving into contact with said arm during a bank of the aircraft in order to sense the direction of turning.

6. In an automatic mechanism as defined in claim 4, wherein said acceleration-responsive switch comprises a spring arm having a weight mounted at one end thereof and a pair of contacts one of which is carried by said spring arm and the other of which is located on the gyro frame, said acceleration switch being located adjacent the axis of the pitch gimbal in order to sense the acceleration forces developed during a turn in either direction.

7. In a gyrovertical having pitch and roll erecting means and pitch and roll gravity-sensitive energizing means for said erecting means, a roll-detector switch positioned about the roll axis of the gyrovertical and having one element positioned by the roll gimbal of the gyrovertical to close said detector switch, an acceleration-sensitive switch positioned so as to be closed in response to acceleration forces encountered during a turn in either direction, said switches being in series and including in series a solenoid energized when both switches are closed simultaneously, and switch means operated by the energization of said solenoid to disengage the roll erecting means from the roll gravity-sensitive energizing means so that no roll erection can take place during turning movements of the aircraft.

8. In a gyrovertical as defined in claim 7, wherein said roll erection means is connected to said roll gravity-sensitive energizing means by an electrical circuit, and said switch means is placed within said circuit.

9. In a gyrovertical having pitch and roll erection means responsive, respectively, to pitch and roll gravity-sensitive energizing means, a roll-detector switch positioned about the roll axis to sense the direction of turning of the mounting craft, an acceleration-responsive switch in series with said roll-detector switch and positioned on said gyrovertical to be closed in response to acceleration forces developed during turning, a first solenoid energized by said switches when the craft turns in one direction and a second solenoid energized by said switches when the craft turns in the other direction, a first series of switches under control of said first solenoid and moved by said solenoid into position to have said roll-erecting means controlled by said pitch gravity-sensitive energizing means to exert erecting torques, and a second series of switches operated by said second solenoid to have said roll-erecting means controlled by said pitch-responsive gravity energizing means to exert erecting torques in opposite directions from those exerted when said first solenoid is energized.

10. In a gyrovertical as defined in claim 9 wherein said roll-detector switch comprises a contact arm positioned by the roll gimbal of the gyroscope and a pair of contact plates carried by the frame of the gyroscope and separated by an insulating section, one of said plates moving into contact with the contact arm during a turn in one direction and the other of said plates moving into contact with the wiper arm during a turn in the other direction.

11. A gyrovertical of the type having pitch and roll-erection means responsive respectively to pitch and roll gravity-sensitive means and in which the roll-erection means is disengaged from the roll gravity-sensitive means during a turn, comprising roll-detector means for detecting both turn and direction of turn of the mounting craft, acceleration-responsive means mounted by the gyrovertical in position to be responsive to acceleration forces experienced during a turn, and means responsive to both said roll-detecting means and said acceleration-responsive means for disengaging said roll-erecting means from said roll gravity-sensitive means.

12. A gyrovertical for a movable craft having pitch and roll erecting means and pitch and roll gravity-sensitive means for energizing said erecting means, roll-detector means for detecting turning movement of said craft, acceleration responsive means mounted by said craft in position to be responsive to acceleration forces experienced during turning of said craft and means responsive to both said roll-detector means and said acceleration-responsive means for disengaging the roll erecting means from the roll gravity-sensitive energizing means so that no roll erection can take place during turning movements of the craft.

13. An automatic mechanism for modifying the control of the roll erection means for a gyrovertical during a turn of the mounting craft, comprising roll detector means positioned about the roll axis of the craft to detect turning movement of the craft, an on-off acceleration-responsive means mounted in position to be responsive to acceleration forces experienced during a turn of the craft and means responsive to both said roll detector means and said acceleration-responsive means to modify the control of the roll erection means.

14. An automatic mechanism for eliminating the control of the roll erection means of a gyrovertical during a turn of the mounting craft, comprising roll detector means positioned about the roll axis of the craft to detect turning movement of the craft, acceleration responsive means mounted in position to be responsive to acceleration forces experienced during a turn of the craft and means responsive to both said roll detector means and said acceleration responsive means to eliminate the control of the roll erection means during a turn.

References Cited in the file of this patent
UNITED STATES PATENTS

| | | |
|---|---|---|
| 2,528,487 | Adkins | Nov. 7, 1950 |
| 2,542,975 | Adkins | Feb. 27, 1951 |
| 2,633,029 | Lajeunnesse | Mar. 31, 1953 |